United States Patent [19]

Steinberg

[11] Patent Number: 5,229,053
[45] Date of Patent: Jul. 20, 1993

[54] METHOD OF MAKING ORNAMENTATION FOR AQUARIUMS

[76] Inventor: William L. Steinberg, 1001 S. Columbine, Denver, Colo. 80209

[21] Appl. No.: 897,326

[22] Filed: Jun. 11, 1992

[51] Int. Cl.$^5$ ............................................. B28B 11/18
[52] U.S. Cl. .................... 264/162; 264/160; 264/294; 264/339
[58] Field of Search .............. 264/138, 157, 160, 162, 264/294, 339; 409/131, 132, 157

[56] References Cited

U.S. PATENT DOCUMENTS

| | | | |
|---|---|---|---|
| D. 239,458 | 4/1976 | Wagschal | 47/66 |
| 1,607,193 | 11/1926 | Fountain | 409/157 |
| 1,812,134 | 6/1931 | Bragger et al. | 264/162 |
| 2,667,822 | 2/1954 | Christman | 264/162 |
| 3,229,011 | 1/1966 | Sutz | 264/160 |
| 3,287,481 | 11/1966 | Trojan et al. | 264/162 |
| 4,292,266 | 9/1981 | Weder et al. | 264/160 |
| 5,040,489 | 8/1991 | Drake | 119/5 |

Primary Examiner—Jay H. Woo
Assistant Examiner—Robert B. Davis
Attorney, Agent, or Firm—Gary M. Polumbus

[57] ABSTRACT

The present invention involves a method for forming aquarium ornaments including the steps of providing a plastic sheet having a plurality of planar surfaces, cutting a strip from the plastic sheet of a predetermined width and having a plurality of lateral edges and a plurality of planar surfaces, roughening the lateral edges of the strip to form a pitted texture in the lateral edges, causing the strip to become pliable and bending the strip into a non-planar shape whereby an ornament is created having lateral edges with a pitted texture such that the edges refract and reflect ambient light to create a luminescent appearance.

20 Claims, 2 Drawing Sheets

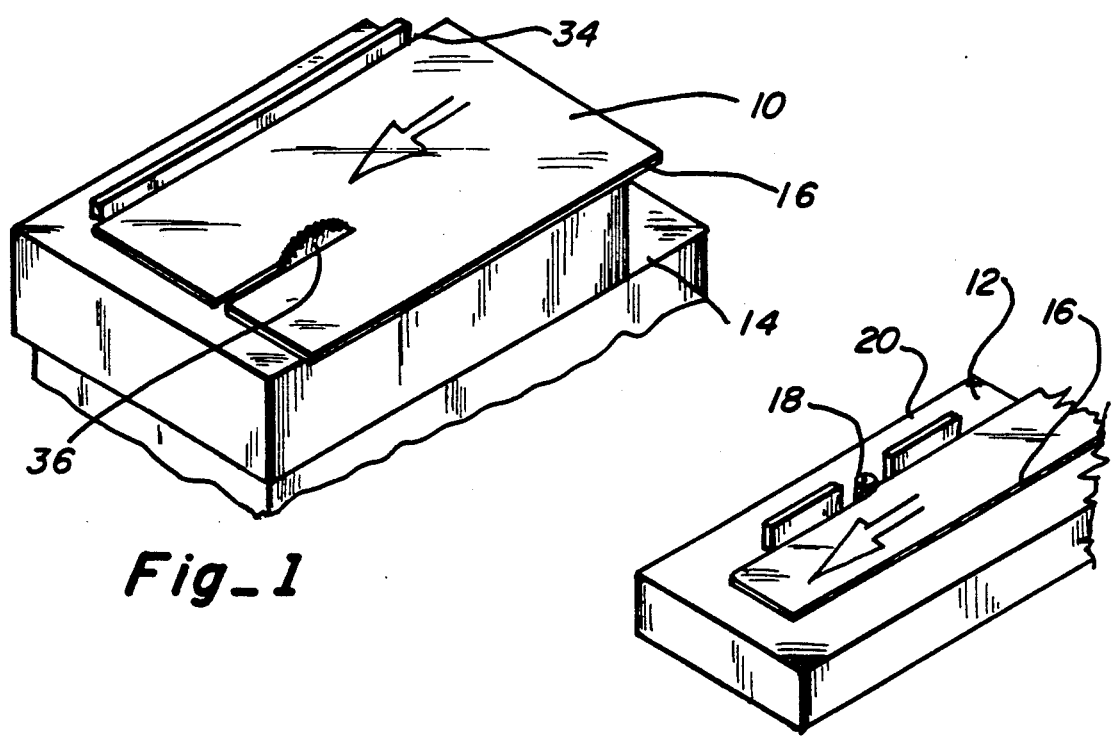
Fig_1
Fig_2
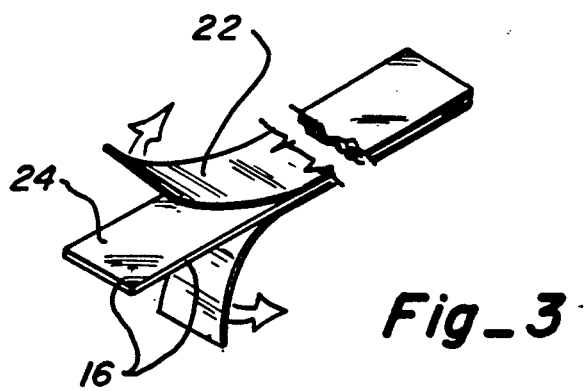
Fig_3
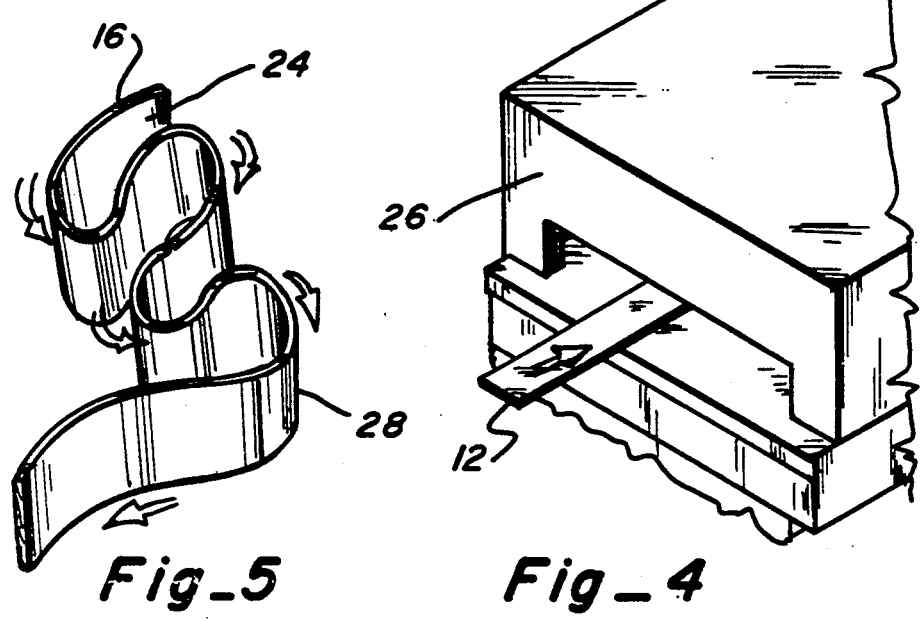
Fig_5
Fig_4

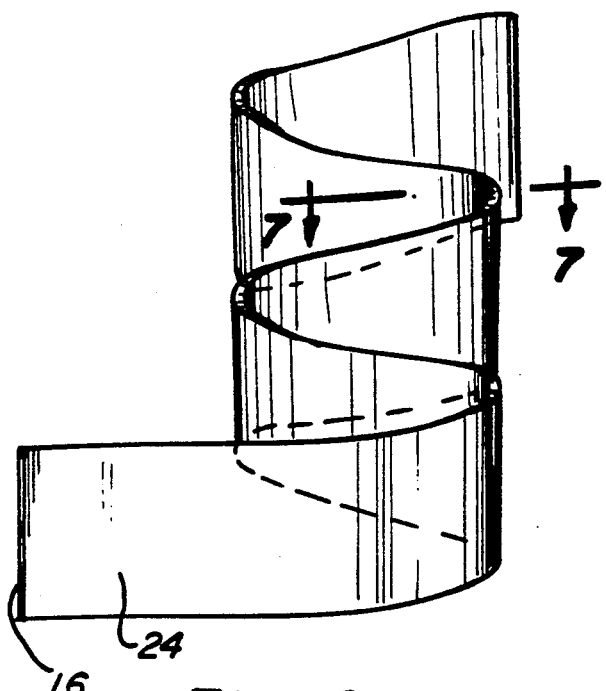
Fig_6
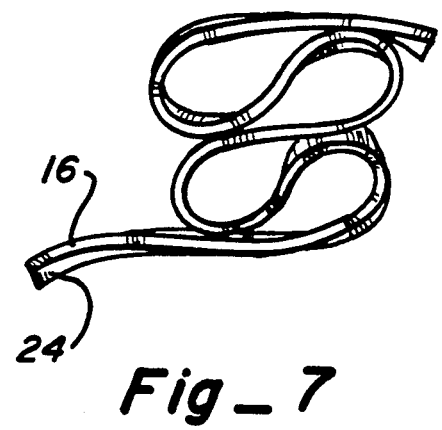
Fig_7
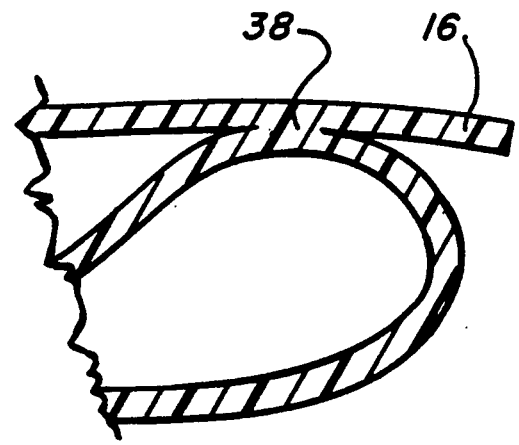
Fig_8
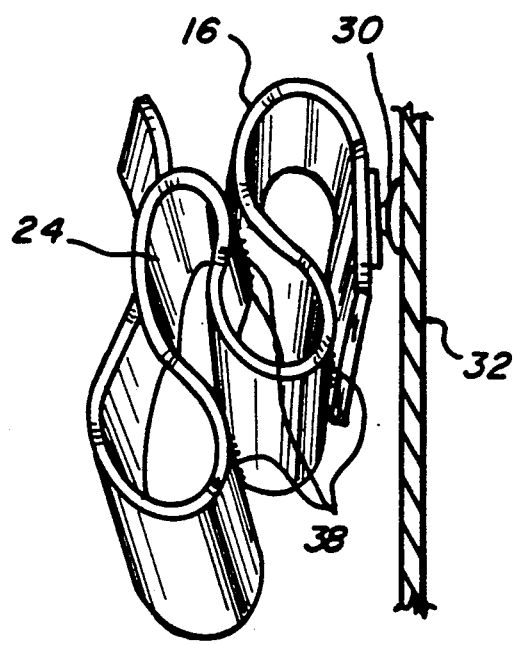
Fig_9

METHOD OF MAKING ORNAMENTATION FOR AQUARIUMS

FIELD OF THE INVENTION

This invention relates generally to a method of forming aquarium ornaments from a sheet of plastic, and more particularly to a method of forming such ornaments to effect a luminescent appearance.

BACKGROUND OF THE INVENTION

Aquariums can be decorated in any number of ways. Commonly, plants, both artificial and natural, and multi-colored gravels are used to create a visually interesting appearance for an aquarium. Also, injection-molded plastic sculptures have been used to decorate aquariums. These types of ornaments commonly take the form of sunken ships, sea divers, treasure chests and other items one might expect to find on the ocean bottom. Regardless of how aquariums have been decorated, however, in order to make an aquarium visually interesting, it has been necessary to obtain costly, tropical fish whose bright, luminescent colors catch the eye and captivate the viewer.

There is no suggestion in the known prior art to give a more contemporary look to aquariums. While the use of bright, luminescent colors generally has become very popular through use of such colors on clothing made of neon fabrics, toys made of luminescent materials, and even automobiles painted with fluorescent colors, no one has attempted to revamp the appearance of aquariums by manufacturing aquarium ornaments that would likewise add life to an otherwise drab decor.

Brightly colored, luminescent ornaments would be ideal to achieve a more contemporary look for an aquarium. Such ornamentation would serve to make an aquarium itself visually interesting, and complement and support the visual interest created by the fish. Further, using luminescent ornaments would uniquely optimize innate characteristics of an aquarium. Conventional fluorescent and ultraviolet aquarium lighting highlights the luminescent nature of such ornaments. The eye-catching tendencies of a luminescent ornament not only enhance the appearance of an aquarium, but transform an ordinary aquarium into a decorative showpiece.

Conventionally, edges of articles of commerce formed from sheet plastic are smoothly finished and/or polished to give an appearance which is smooth both aesthetically and to the touch. In order for an article formed from sheet plastic to take on a desired luminescent appearance so it forms an eye-catching ornament for an aquarium the light-catching ability of the plastic materials must be enhanced. It is against this background that further significant improvements and advancements have evolved per the present invention in the field of making ornaments for aquariums.

SUMMARY OF THE INVENTION

The method of the present invention involves cutting a strip from a plastic sheet, the strip being of a pre-determined length and width, with an ordinary table saw or similar device. The strip of plastic is then drawn over a device such as a router or jointer, engaging the lateral edges of the strip with the head of the router or jointer. The router forms a plurality of minute pits in the lateral edges of the plastic strip, the pits acting as a plurality of miniature prisms.

The cut and routed plastic strip, after removing any protective covering from the planar surfaces thereof, is then inserted into an oven or kiln where it is heated. Once the strip has been heated to a point where it has become pliable, the strip is removed from the oven and formed into a pre-determined artistic or other desired shape. Upon cooling, the strip takes the form of a very unique aquarium ornament whose lateral edges, as the result of the prismatic shapes formed therein, appear luminescent. A suction cup may be secured to the planar surfaces of the ornament in order to mount the ornament on inner-planar surfaces of an aquarium, or the ornaments may be placed on the bottom of the aquarium.

Ornamentation having such luminescent properties neither is known nor has heretofore been used in aquariums. Further, the ornaments produced by the method of the present application function optimally under ultraviolet and fluorescent light typically used in aquariums. As a result, ornaments produced by the method of the present invention greatly enhance the appearance of aquariums.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a fragmentary isometric view of a sheet of plastic being cut on a table saw as a first step in fabricating an aquarium ornament in accordance with the present invention.

FIG. 2 is a fragmentary isometric view of a strip of plastic being roughened along a lateral edge.

FIG. 3 is a isometric view of strip of cut plastic having its protective covering removed.

FIG. 4 is a fragmentary isometric view of an uncovered strip of cut plastic being inserted into an oven for heating.

FIG. 5 is an isometric view of a strip of plastic after heating and as it is being molded into an ornamental shape.

FIG. 6 is an isometric view showing the configuration of the strip after preliminary forming.

FIG. 7 is a front elevation of a formed ornament.

FIG. 8 is a fragmentary vertical section taken through the ornament as shown in FIG. 6 illustrating the bonding of adjacent positions of the ornament.

FIG. 9 is a formed ornament with an associated suction cup secured to a planar wall of an aquarium.

DETAILED DESCRIPTION OF THE DRAWINGS

The method of the present invention involves a number of steps. A plastic sheet 10 is cut into strips 12 on a cutting means such as a table saw 14. Once the sheet is cut into strips, the lateral edges of each strip 16 are engaged with a bit or a blade 18 of a roughening tool 20 such as a router or jointer. From a gross standpoint, engaging the lateral edges of the strip with the bit or blade of the roughening tool smoothes the edges which are left somewhat ragged by the cutting process. However, this process in actuality creates tiny, almost microscopic pits in the lateral edges of the strip. After the edges have been processed, protective coverings 22 covering the planar surfaces of the strip 24 are removed. The uncovered plastic strip is then placed in an oven or kiln 26 where the strip is heated until pliable. Once the strip has been rendered pliable, the strip is folded or otherwise formed to create an ornament 28. An attachment means 30 such as a suction cup may be attached to the ornament so the ornament may be affixed to a planar surface such as an aquarium wall 32.

Generally, the aquarium ornaments formed by the method of the present invention are fabricated from sheets of plastic 10. Lucite-L, an acrylic, made by Du Pont is one suitable material. Such material typically is cast in sheets and, after casting, the sheets, planar faces or surfaces are covered by an adhesive-backed paper covering 22. The paper covering protects the material during both shipping and subsequent manufacture. As will be further appreciated with reference to the remainder of the detailed description, bright, neon, or fluorescent colors are preferable.

FIG. 1 depicts the first step in forming aquarium ornaments by the method of the present invention. The plastic sheet 10 is cut into strips on a table saw 12. The length and width of each strip, as well as the thickness of the plastic sheet used, is predetermined by the configuration and shape of the ornament that is ultimately desired. Although the length and thickness of the strip will be determined as the result of the initial plastic sheet selected, the width of the strip can be determined by the positioning of a guide 34 on the table saw. Although the cutting by the table saw, specifically by a blade of the table saw 36, which may be of a rotating or reciprocating type, will leave a somewhat ragged, lateral edge to each strip, this will not adversely impact the method of the present invention. It should be noted that the paper covering protecting the planar surfaces of the plastic will protect the planar surfaces as the planar surfaces are being drawn over an upper surface of such devices as the table saw.

FIG. 2 depicts a strip of plastic 12 as cut in FIG. 1 being drawn across a router or a jointer 20. The head of the router or jointer 18, the head being a bit for a router and a blade for a jointer, is engaged with lateral edges 16 of the strip. The routing of the edges of the plastic strip is significant in that the head of the router, while from a gross standpoint smoothes the somewhat ragged edges of the strip left by the cutting process, in reality roughens the edges, creating tiny, almost microscopic pits in the lateral edges of the strip. As a result, the lateral edges of the strip are imbedded with a plurality of pits (not shown) which act as miniature prisms. These pits create a luminescent effect not unlike that created by reflectors used on bicycles and automobiles, only on a much more minute scale.

FIG. 3 depicts the removal of the protective adhesive-backed paper 22 from the planar surfaces of the plastic strip 12 after the strip has been cut and its edges roughened. The paper may be removed because the planar surfaces of the strip 24 will not be conveyed over the upper surfaces of additional machinery; further, the paper should be removed as will appreciated in describing the subsequent step illustrated in FIG. 4.

FIG. 4 depicts a plastic strip 12, absent the paper coverings 22 protecting its planar surfaces 24, being inserted into an oven or kiln 26. Depending on the composition and size of the strip, the strip is heated in this oven at 275 to 350 degrees Fahrenheit for three to eight minutes, which will make the plastic strip desirably pliable. Upon removal from the oven, the plastic strip can be deformed in both its lateral and planar dimensions in order to form various ornamental and geometric shapes.

FIG. 5 shows one possible way an ornament may be formed from a plastic strip 12. In this example, the plastic is repeatedly folded along its planar surfaces 24, together with some moderate lateral twisting, better seen in FIG. 6, in order to form a shape in which the plastic is repeatedly doubled back on itself.

FIG. 6 shows an isometric view of the plastic strip after preliminary forming. After the strip has been preliminarily formed, it can be longitudinally compressed until adjacent surfaces of the generally ribbon-like shapes are engaged as shown in FIG. 7. As best appreciated by reference to FIG. 8, the adjacent, engaged surfaces of the plastic strip actually meld or melt together at the points of engagement 38. The joinder of adjacent surfaces of the strip assist in retaining a desired form while the strip is allowed to cool.

FIG. 9 shows an aquarium ornament formed by the method of the present invention with an associated suction cup device 30 secured thereto. The use of such a suction cup to attach a body to a smooth planar surface is well-known in the art. The suction cup may be double-sided and thereby secured to a planar surface of the ornament through suction. In the alternative, the suction cup may be attached to the ornament by gluing or by frictionally engaging the suction cup with an opening (not shown) formed in a planar surface of the ornament.

The prismatic structure of the lateral edges 16 of the plastic strip serve to catch and transmit rays of light along the lateral length of the strip, particularly when used with a neon-colored plastic. The lateral edges of the ornament formed by the method of the present invention generate a luminescent effect. As a result, these ornaments make for a visually interesting addition to a common aquarium.

Aquarium ornaments having such luminescent properties neither is known nor has heretofore been used in aquariums. Ornaments produced by the method of the present invention represent an improvement over conventional aquarium ornaments. As opposed to ordinary plastic figures of divers or sunken treasure, the eye-catching capacity of luminescent ornaments updates aquarium decoration to be in keeping with contemporary trends emphasizing bright colors and exploitation of light generally. Further, the ornaments produced by the method of the present application function optimally under ultraviolet and fluorescent light typically used in aquariums because such lighting emphasizes the luminescent properties of such ornaments. Consequently, an aquarium decorated with ornaments produced by this method is visually interesting in and of itself, complementing and supporting the visual interest generated by the fish themselves, even if relatively ordinary, inexpensive fish populate the aquarium. In sum, employing aquarium ornaments produced by the method of the present application not only enhances the appearance of ordinary aquariums, but makes aquariums useful as decorative showpieces.

A presently preferred embodiment of the present invention has been described with a degree of particularity. This description has been made by way of preferred example and is based on a present understanding of knowledge available regarding the invention. It should be understood, however, that the scope of the present invention is defined by following claims, and not necessarily by the detailed description of the preferred embodiment.

I claim:

1. A method for forming aquarium ornaments comprising the steps of:

providing a plastic sheet;

cutting the plastic sheet into a predetermined form such that the form defines a plurality of lateral edges;

roughening the lateral edges of the form to create a pitted texture in the lateral edges;

causing the form to become pliable; and bending the form into a non-planar shape to define an ornament having lateral edges with a pitted texture such that the lateral edges refract and reflect ambient light to create a luminescent appearance.

2. The method of claim 1 wherein said form is an elongated strip and further comprising the step of providing a cutting means for cutting the strip from said plastic sheet.

3. The method of claim 1 further comprising the step of providing a roughening means for roughening the lateral edges of the strip.

4. The method of claim 3 further comprising the step of providing a roughening means having a head comprising one of a rotating bit or blade for roughening the lateral edges of the plastic strip.

5. The method of claim 4 further comprising the step of providing as the roughening means one of a router or a jointer.

6. The method of claim 4 further comprising the step of roughening the lateral edges of the strip by engaging the lateral edges of the strip with the head of the roughening means.

7. The method of claim 4 further comprising the step of engaging the head of the roughening means with all lateral edges of the strip.

8. The method of claim 1 wherein the plastic sheet has a plurality of planar surfaces and is provided with a protective covering on its planar surfaces.

9. The method of claim 8 further comprising the step of leaving the protective covering on the planar surfaces of the plastic sheet while the strip is being cut from the plastic sheet.

10. The method of claim 9 further comprising the step of leaving the protective covering on the planar surfaces of the strip while the lateral edges of the strip are being roughened.

11. The method of claim 10 further comprising the step of removing the protective covering from the planar surfaces of the strip after the strip has been cut from the sheet and the lateral edges of the strip have been roughened.

12. The method of claim 1 further comprising the step of making the strip pliable by heating the plastic strip.

13. The method of claim 12 further comprising the step of heating the plastic strip to a temperature of not substantially less than 275 degrees Fahrenheit and not substantially more than 300 degrees Fahrenheit.

14. The method of claim 12 further comprising the step of heating the plastic strip for not substantially less than three minutes and not substantially more than eight minutes.

15. The method of claim 1 further comprising the step of forming the strip by bending planar surfaces of the strip.

16. The method of claim 1 further comprising the step of forming the strip by bending the lateral edges of the strip.

17. The method of claim 15 further comprising the step of pressing adjacent planar surfaces of the strip into contact with each other.

18. The method of claim 17 further comprising the step of pressing the planar surfaces of the strip into contact with each other and permitting the contacted planar surfaces to meld together.

19. The method of claim 1 further comprising the step of connecting an attachment means to the strip after the ornament has been formed.

20. The method of claim 19 further comprising the step of providing a suction cup as the attachment means.

* * * * *